United States Patent
Kurashina et al.

(10) Patent No.: US 9,151,538 B2
(45) Date of Patent: Oct. 6, 2015

(54) DRYING DEVICE AND DRYING METHOD FOR HOLLOW FIBER MEMBRANES

(75) Inventors: Masaki Kurashina, Otake (JP); Toshinori Sumi, Otake (JP); Yasuo Hiromoto, Otake (JP); Hiroyuki Fujiki, Otake (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 462 days.

(21) Appl. No.: 13/808,189

(22) PCT Filed: Jul. 7, 2010

(86) PCT No.: PCT/JP2010/061527
§ 371 (c)(1),
(2), (4) Date: Jan. 3, 2013

(87) PCT Pub. No.: WO2012/004865
PCT Pub. Date: Jan. 12, 2012

(65) Prior Publication Data
US 2013/0104416 A1    May 2, 2013

(51) Int. Cl.
*F26B 3/06* (2006.01)
*B01D 69/00* (2006.01)
(Continued)

(52) U.S. Cl.
CPC .............. *F26B 25/14* (2013.01); *B01D 63/021* (2013.01); *B01D 67/0095* (2013.01); *B01D 69/087* (2013.01); *D02J 13/00* (2013.01); *F26B 3/06* (2013.01); *F26B 21/006* (2013.01); *F26B 21/008* (2013.01); *B01D 2323/42* (2013.01); *F26B 13/08* (2013.01)

(58) Field of Classification Search
CPC ............ F26B 3/06; F26B 13/06; F26B 13/08; F26B 13/108; F26B 21/006; D21F 11/145; D21F 5/182; D21F 5/184; B41F 23/0426; D02J 13/001; B01D 63/021; B01D 67/0095
See application file for complete search history.

(56) References Cited

U.S. PATENT DOCUMENTS

| | | |
|---|---|---|
| 5,182,868 A | 2/1993 | Porta et al. |
| 2007/0114167 A1 | 5/2007 | Mabuchi et al. |
| 2011/0263020 A1 | 10/2011 | Zweigart et al. |

FOREIGN PATENT DOCUMENTS

| | | |
|---|---|---|
| CN | 1130543 A | 9/1996 |
| CN | 1625615 A | 6/2005 |

(Continued)

OTHER PUBLICATIONS

Extended European Search Report issued Oct. 25, 2013 in Patent Application No. 10854420.6.
(Continued)

*Primary Examiner* — David J Laux
(74) *Attorney, Agent, or Firm* — Oblon, McClelland, Maier & Neustadt, L.L.P.

(57) ABSTRACT

Disclosed is a drying device for a hollow fiber membrane, including: a tubular drying member that is formed with an opening portion through which a hollow fiber membrane is input and output at at least one end thereof in a length direction, the hollow fiber membrane passing inside the tubular drying member while forming a gap between the hollow fiber membrane and an inner circumferential surface of the tubular drying member; and a gas supply unit that is formed on a side surface of the tubular drying member and supplies a drying gas into the tubular drying member. Thus, it is possible to dry the hollow fiber membrane in a short time at a low cost without the necessity of large equipment.

32 Claims, 6 Drawing Sheets

(51) Int. Cl.
*B01D 67/00* (2006.01)
*F26B 25/14* (2006.01)
*F26B 21/00* (2006.01)
*B01D 69/08* (2006.01)
*D02J 13/00* (2006.01)
*B01D 63/02* (2006.01)
*F26B 13/08* (2006.01)

(56) References Cited

FOREIGN PATENT DOCUMENTS

| EP | 1 693 076 A1 | 8/2006 |
|---|---|---|
| EP | 2 168 668 A1 | 3/2010 |
| JP | 50 59518 | 5/1975 |
| JP | 60-78604 A | 5/1985 |
| JP | 60 166008 | 8/1985 |
| JP | 63-270864 A | 11/1988 |
| JP | 2-187133 A | 7/1990 |
| JP | 4 256423 | 9/1992 |
| JP | 6 10208 | 1/1994 |
| JP | 9-888 A | 1/1997 |
| JP | 2001 259380 | 9/2001 |
| JP | 2002 253938 | 9/2002 |
| JP | 2004 353142 | 12/2004 |
| JP | 2005 42074 | 2/2005 |
| JP | 2005-87945 A | 4/2005 |
| JP | 2005 220202 | 8/2005 |
| JP | 2006 231276 | 9/2006 |
| JP | 2008-207050 A | 9/2008 |
| JP | 2010 149044 | 7/2010 |
| WO | WO 96/04413 A1 | 2/1996 |

OTHER PUBLICATIONS

Japanese Office Action Issued May 22, 2012 in JP Patent Application No. 2008-329811 (with English translation).
Japanese Office Action Issued Oct. 30, 2012 in JP Patent Application No. 2008-329811 (with English translation).
International Search Report Issued Aug. 10, 2010 in PCT/JP10/061527 Filed Jul. 7, 2010.
Combined Office Action and Search Report issued Mar. 25, 2014 in Chinese Patent Application No. 201080067896.5 with English language translation.
Office Action issued Apr. 2, 2013 in Japanese Patent Application No. 2010-530788 with English language translation.

DRYING DEVICE AND DRYING METHOD FOR HOLLOW FIBER MEMBRANES

TECHNICAL FIELD

The present invention relates to a drying device that dries a hollow fiber membrane appropriately used for a filtration membrane or the like, and a drying method that uses the drying device.

BACKGROUND ART

In the fields of the food industry, medicine, electronics industry and the like, for concentration and recovery of useful components, removal of useless components, fresh water generation or the like, a hollow porous fiber membrane that is made of cellulose acetate, polyacrylonitrile, polysulfone, fluorine-based resin or the like using wet or dry-wet spinning, for example, has been widely used in a precision filtration membrane, an ultra filtration membrane, a reverse osmosis filtration membrane, or the like.

In a case where the hollow fiber membrane is manufactured by wet or dry-wet spinning, a membrane forming dope including a hydrophobic polymer and a hydrophilic polymer is firstly prepared. Then, the hollow fiber membrane is formed by a coagulation process of discharging the membrane forming dope in an annular shape and coagulating the membrane forming dope in a coagulating liquid. Here, the membrane forming dope may be introduced into the coagulating liquid through an idle running unit that is in contact with air (dry-wet spinning method), or may be directly introduced into the coagulating liquid (wet spinning method).

Since the hydrophilic polymer normally remains in porous portions of such a hollow fiber membrane in a solution state, the hydrophilic polymer is normally removed by washing or the like, and then, the hollow fiber membrane is dried.

In this regard, in drying the hollow fiber membrane, a hot air circulation drying device, as disclosed in paragraph 0049 of PTL 1, for example, is widely used. Specifically, a method of causing the hollow fiber membrane to continuously run in a drying device in which hot air is circulated at a wind speed of about several meters per second and supplying the hot air to the outer circumferential side of the hollow fiber membrane to dry the hollow fiber membrane is used.

CITATION LIST

Patent Literature

[PTL 1] Japanese Unexamined Patent Application, First Publication No. 2005-220202

DISCLOSURE OF INVENTION

Problems to be solved by the Invention

However, in order to sufficiently dry the hollow fiber membrane using such a hot air circulation drying device, it is necessary to allow the hollow fiber membrane to reciprocate in the drying device several times to set a staying time thereof to about several minutes, which demands a drying time. Further, since such a drying device is large in size, a broad installation space is necessary, and a necessary amount of hot air is also large. In this way, according to the drying method in the related art, it is difficult to dry the hollow fiber membrane in a short time at a low cost.

The present invention has been made in view of such circumstances and an object of the invention is to provide a drying device for a hollow fiber membrane that is capable of drying the hollow fiber membrane in a short time at a low cost without the necessity of large equipment, and a drying method that uses the drying device.

Means to Solve the Problems

According to an aspect of the invention, there is provided a drying device for a hollow fiber membrane, including: a tubular drying member that is formed with an opening portion through which a hollow fiber membrane is input and output at at least one end thereof in a length direction, the hollow fiber membrane passing inside the tubular drying member while forming a gap between the hollow fiber membrane and an inner circumferential surface of the tubular drying member; and a gas supply unit that is formed on a side surface of the tubular drying member and supplies a drying gas into the tubular drying member.

It is preferable that a portion of the tubular drying member where the gas supply unit is formed be a diameter expansion portion that is expanded in diameter with respect to a different portion thereof.

It is preferable that a gas dispersing element that disperses the drying gas from the gas supply unit be disposed in the diameter expansion portion.

It is preferable that the tubular drying member be capable of passing the plurality of hollow fiber membranes therethrough.

It is preferable that the tubular drying member be vertically disposed.

According to another aspect of the invention, there is provided a drying method for a hollow fiber membrane that uses the drying device as described above, including the steps of: supplying the drying gas into the tubular drying member from the gas supply unit and injecting part of the drying gas into a hollow portion of the hollow fiber membrane from the outside of the hollow fiber membrane.

Here, it is preferable that the drying method further include the step of: discharging the moisture contained in the hollow fiber membrane from an outer surface of the hollow fiber membrane by a pressure difference, between the outside of the hollow fiber membrane and the hollow portion thereof that occurs outside the tubular drying member.

Further, it is preferable that the drying method further include the step of: discharging the drying gas injected in the hollow portion to the outside of the hollow fiber membrane from the hollow portion thereof by a pressure difference, between the outside of the hollow fiber membrane and the hollow portion thereof that occurs outside the tubular drying member.

Further, it is preferable that the hollow fiber membrane pass through the tubular drying member that is vertically disposed.

Effect of the Invention

According to the invention, it is possible to provide a drying device for a hollow fiber membrane that is capable of drying the hollow fiber membrane in a short time at a low cost without the necessity of large equipment, and a drying method that uses the drying device.

EMBODIMENTS FOR CARRYING OUT THE INVENTION

Figure 1:
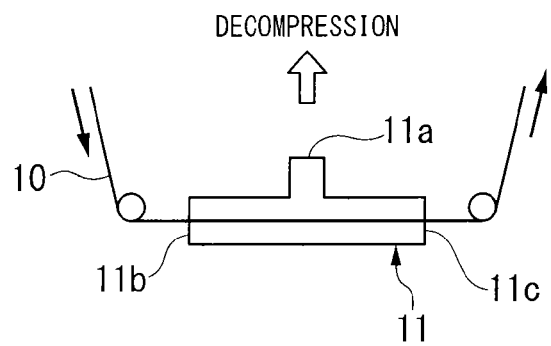
FIG. 1 is a configuration diagram schematically illustrating an example of a hydrophilic polymer removal process.

Hereinafter, a hollow fiber membrane manufacturing method that includes a coagulation process of coagulating a membrane forming dope that includes a hydrophobic polymer and a hydrophilic polymer in a coagulating liquid to form a hollow fiber membrane, a hydrophilic polymer removal process of removing the hydrophilic polymer that remains in the formed hollow fiber membrane, and a drying process of drying the hollow fiber membrane from which the hydrophilic polymer is removed will be described as an example, and a drying device and a drying method of the invention, applied to the drying process will be described in detail.

[Coagulation Process]

In the hollow fiber membrane manufacturing method according to the present embodiment, first, the membrane forming dope that includes the hydrophobic polymer and the hydrophilic polymer is prepared. Then, the membrane forming dope is discharged from a nozzle in which an annular discharge port is formed into the coagulating liquid, and the hollow fiber membrane is formed by the coagulation process of coagulating the membrane forming dope in the coagulating liquid.

The coagulation process may be performed by either a dry-wet spinning method in which the membrane forming dope is introduced into the coagulating liquid through an idle running unit that is in contact with air, or a wet spinning method in which the membrane forming dope is directly introduced into the coagulating liquid. Further, there is no particular limit to a configuration of the hollow fiber membrane to be manufactured. For example, the hollow fiber membrane may have a configuration in which a porous base material is provided, or may have a multi-layer structure that is durable against friction or the like during handling.

As for an example of the porous base material, there is no particular limitation, but hollow braids, braided cords or the like that are braided by various fibers may be used, or various materials may be used independently or in combination. As for the fibers used for the hollow braids or braided cords, synthetic fibers, semi-synthetic fibers, regenerated fibers, natural fibers or the like may be used, and the fiber type may be any one type of monofilament, multifilament, and spun yarn.

It is sufficient if the hydrophobic polymer can form the hollow fiber membrane by the coagulation process, and thus, the hydrophobic polymer has no particular limitation in this range. However, as for the hydrophobic polymer, a polysulfone-based resin such as polysulfone or polyether sulfone, a fluorine-based resin such as polyvinylidene fluoride, polyacrylonitrile, cellulose derivate, polyamide, polyester, polymethacrylate, polyacrylate, or the like may be used. Further, a copolymer of these resins may be used, or a material obtained by introducing a substituent to a part of these resins or copolymer may be used. Further, the same type of polymers that are different from each other in molecular weight or the like may be mixed for use, or two types or more resins that are different from each other may be mixed for use. Here, a copolymer that includes the fluorine-based resin, particularly, polyvinylidene fluoride or vinylidene fluoride, a simple substance and a different monomer is superior in durability for an oxidizing agent such as a hypochlorous acid or the like. Accordingly, for example, in a case where the hollow fiber membrane to be processed by the oxidizing agent is manufactured in the hydrophilic polymer removal process or the like (to be described later), it is preferable to select the fluorine-based resin as the hydrophobic polymer.

The hydrophilic polymer is added to adjust the viscosity of the membrane forming dope in a range suitable for formation of the hollow fiber membrane and to achieve stability of the membrane forming state, and may preferably employ polyethylene glycol, polyvinyl-pyrrolidone or the like. Here, from the viewpoint of hole diameter control of the hollow fiber membrane and strength of the hollow fiber membrane, polyvinyl-pyrrolidone or a copolymer obtained by polymerizing a different monomer to the polyvinyl-pyrrolidone is preferable.

Further, as for the hydrophilic polymer, two types or more resins may be mixed for use. For example, if a polymer having a high molecular weight is used as the hydrophilic polymer, it is easy to form the hollow fiber membrane having a favorable membrane structure. On the other hand, the hydrophilic polymer having a low molecular weight is preferable in that the hydrophilic polymer having a low molecular weight is easily removed from the hollow fiber membrane in the hydrophilic polymer removal process (to be described later). Accordingly, the same type of hydrophilic polymers having different molecular weights may be appropriately blended for use as necessary.

By mixing the above-mentioned hydrophobic polymer and the hydrophilic polymer with a solvent (good solvent) that are capable of dissolving these polymers, it is possible to manufacture the membrane forming dope. A different additive may be added to the membrane forming dope as necessary.

There is no particular limitation to the type of the solvent, but in a case where the coagulation process is performed in the dry-wet spinning, since the hole diameter of the hollow fiber membrane is adjusted by moisture-adsorbing the membrane forming dope in the idle running unit, it is preferable to select a solvent that is easily and uniformly mixed with water. As such a solvent, N, N-dimethylformamide, N,N-dimethylacetamide, dimethyl sulfoxide, N-methyl-2-pyrrolidone, N-methylmorpholine-N-oxide, or the like may be used, or one or more types thereof may be used. Further, in a range where solubility of the hydrophobic polymer or the hydrophilic polymer to the solvent is not lost, a lean solvent of the hydrophobic polymer or the hydrophilic polymer may be mixed therewith for use. The temperature of the membrane forming dope is not particularly limited, but is normally 20 to 40° C.

If the concentration of the hydrophobic polymer in the membrane forming dope is too low or too high, there is a tendency that stability at the time of membrane forming is reduced and it is thus difficult to form a preferable hollow fiber membrane structure. Thus, the lower limit of the concentration is preferably 10 mass %, and more preferably 15 mass %. Further, the upper limit thereof is preferably 30 mass %, and more preferably 25 mass %.

On the other hand, in order to more easily form the hollow fiber membrane, the lower limit of the concentration of the hydrophilic polymer is preferably 1 mass %, and more preferably 5 mass %. The upper limit of the concentration of the hydrophilic polymer is preferably 20 mass %, and more preferably 12 mass % from a viewpoint of a handling operation of the membrane forming dope.

As for the coagulating liquid, it is possible to use water, alcohol, glycerine, ethylene glycol, or the like independently or in mixture. The temperature of the coagulating liquid is not particularly limited, but is normally 60 to 90° C.

[Hydrophilic Polymer Removal Process]

The hollow fiber membrane formed by the above-mentioned coagulation process are generally large in hole diameter and potentially has high permeability, but since a large amount of hydrophilic polymer remains in the hollow fiber membrane in a solution state, it is difficult to achieve sufficiently high permeability up to now. Accordingly, after the coagulation process, it is preferable to perform the hydrophilic polymer removal process of removing the hydrophilic polymer that remains in the hollow fiber membrane.

As a specific method of the hydrophilic polymer removal process, there is no particular limitation, but for example, it is preferable to use a process that includes a preliminary process, a decompression process and a washing liquid supply process.

In the hollow fiber membrane obtained in the coagulation process, the hydrophilic polymer remains in the membrane (porous portions) in the state of high concentration solution. Such a hydrophilic polymer of high concentration is relatively easily removed to a certain extent by immersing the hollow fiber membrane in the washing liquid. Accordingly, as for the preliminary process, a method of sequentially performing (i) a hollow fiber membrane washing process of immersing and washing the hollow fiber membrane in the washing liquid is first performed, (ii) a low molecular weight process of reducing a molecular weight of the hydrophilic polymer using the oxidizing agent, and (iii) a washing process of the hydrophilic polymer of which the low molecular weight is reduced may be used.

(i) As for the washing liquid used in the hollow fiber membrane washing process, there is no particular limit as long as the washing liquid is a liquid in which the hydrophilic polymer is clearly dispersed or dissolved, but water is preferable in view of a high washing effect. Tap-water, industrial water, river water, well water or the like may be used as the water to be used, or an alcohol, inorganic salt, an oxidizing agent, a surfactant or the like may be mixed therewith for use. Further, a liquid mixture of a good solvent of the hydrophobic polymer and water may be used as the washing liquid.

It is preferable that the washing temperature is high in order to suppress the viscosity of the hydrophilic polymer solution to be low and to prevent reduction in a diffusion moving velocity. Here, the washing temperature is preferably 50° C. or higher, and more preferably 80° C. or higher. Further, if washing is performed while boiling the washing liquid, it is possible to wipe out the outer surface of the hollow fiber membrane by bubbles caused by boiling, and thus, it is possible to efficiently perform the washing.

(i) According to the washing process of the hollow fiber membrane, the hydrophilic polymer that remains in the hollow fiber membrane is in a state where the concentration is relatively low. In the case of the low concentration, in order to achieve a higher washing effect, (ii) it is preferable to perform the low molecular weight process of the hydrophilic polymer using the oxidizing agent.

Specifically, first, it is preferable to use a method of retaining a liquid medicine that includes the oxidizing agent in the hollow fiber membrane and heating the hollow fiber membrane that retains the liquid medicine in a gaseous phase. Ozone, hydrogen peroxide, permanganate, dichromate, persulfate or the like may be used as the oxidizing agent, but the hypochlorite is particularly preferable in view of strong oxidizing power, superior resolution performance, excellent handling, low cost, and the like. Sodium hypochlorite, calcium hypochlorite or the like may be used as the hypochlorite, but the sodium hypochlorite is particularly preferable.

In this regard, the temperature of the liquid medicine is preferably 50° C. or lower, and more preferably 30° C. or lower. If the temperature is higher than 50° C., oxidative decomposition is promoted during immersing of the hollow fiber membrane. Thus, the dropped hydrophilic polymer is further oxidative-decomposed in the liquid medicine, and the oxidizing agent is wasted. On the other hand, if the temperature is excessively low, the oxidative decomposition is suppressed, but the cost or the like for controlling the temperature to be low tends to increase, compared with the case of being performed at a normal temperature. Accordingly, from this viewpoint, the temperature of the liquid medicine is preferably 0° C. or higher, and more preferably 10° C. or higher.

After the liquid medicine is retained in the hollow fiber membrane, the hydrophilic polymer is oxidative-decomposed by heating the hollow fiber membrane in the gaseous phase. According to the heating in the gaseous phase, the liquid medicine retained in the hollow fiber membrane is rarely diluted in a large amount, and the liquid medicine is rarely dropped and eluted to a heating medium. Here, the oxidizing agent in the liquid medicine is efficiently used for decomposition of the hydrophilic polymer that remains in the hollow fiber membrane, which is preferable.

A method of heating the hollow fiber membrane using a heating fluid under the atmospheric pressure is preferably used as a specific heating method. If a fluid having high relative humidity is used as the heating fluid, that is, if the heating is performed under a humid heating condition, it is possible to prevent drying of the oxidizing agent such as hypochlorite to perform an efficient decomposition process, which is preferable. In this regard, the relative humidity of the fluid is preferably 80% or higher, more preferably 90% or higher, and most preferably approximately 100%.

The lower limit of the heating temperature is preferably set to 50° C., and more preferably 80° C., since it is possible to reduce the processing time in a case where a continuous process is performed. The upper limit of the temperature is preferably set to 100° C. in the atmospheric pressure state.

In this way, after (ii) the low molecular weight process of the hydrophilic polymer that uses the oxidizing agent is performed, it is preferable to perform (iii) the washing process of the hydrophilic polymer of which the low molecular weight is reduced for immersing and cleaning the hollow fiber membrane again in the washing liquid and removing the hydrophilic polymer of which the low molecular weight is reduced to a certain degree under the same condition as in (i) the above-mentioned washing process of the hollow fiber membrane.

After the preliminary process is necessarily performed in this way, the decompression process is performed. According to the decompression process, it is possible to effectively remove the hydrophilic polymer that remains after the preliminary process.

The decompression process is a process of decompressing the outside of the hollow fiber membrane and discharging the hydrophilic polymer that remains in the hollow fiber membrane to the outside of the hollow fiber membrane, in which the pressure of the outside of the hollow fiber membrane is lower than that of the hollow portion, and the hydrophilic polymer is moved to the outside of the hollow fiber membrane due to the pressure difference at this time for removal.

There is no particular limitation in a specific method of the decompression process, but for example, as shown in FIG. 1, it is preferable to use a tubular member 11 in which a connection port 11a for connection of decompression means such as a decompression pump is formed on a side surface (circumferential surface), a clearance through which a hollow fiber membrane 10 can pass is provided, and a seal mechanism capable of retaining the inside of the tubular member 11 in a decompressed state or a pressurized state compared with the outside thereof is installed at opposite ends 11b and 11c. By arranging the tubular member 11 having such a configuration in the gaseous phase such as atmosphere and by operating the decompression means while continuously introducing the hollow fiber membrane 10 passed through the coagulation process and the preliminary process as necessary into the tubular member 11 from the end 11b, the outside of the hollow fiber membrane 10 is decompressed in the tubular member 11, and the hydrophilic polymer that remains in the hollow fiber membrane 10 is accompanied by the gaseous phase and is adsorbed and removed to the outside of the hollow fiber membrane 10.

Figure 2:
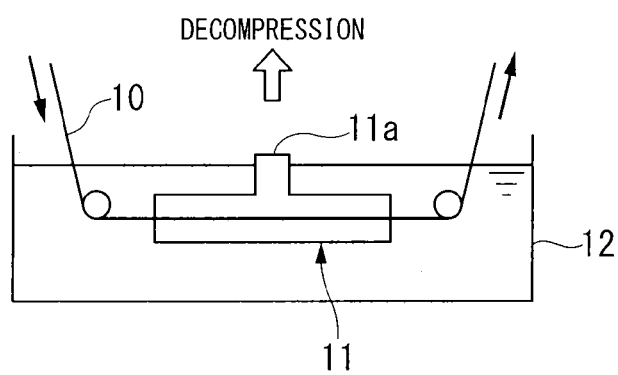
FIG. 2 is a configuration diagram schematically illustrating another example of a hydrophilic polymer removal process.

Further, as a more preferable method, as shown in FIG. 2, a method of preparing a washing tank 12 in which the washing liquid is contained, immersing the hollow fiber membrane 10 in the washing tank 12, and performing the above-described decompression process for the hollow fiber membrane 10 that is immersed in the washing liquid is used.

In a case where the decompression process is performed in this way, if the pressure difference between the hollow portion of the hollow fiber membrane 10 and the outside thereof is large, in a portion of the hollow fiber membrane 10 that is output from the tubular member 11 and is immersed in the washing liquid, the washing liquid in the washing tank 12 passes through the membrane and is introduced into the hollow portion of the hollow fiber membrane 10.

Thereafter, the introduced washing liquid passes through the membrane again by the operation of the decompression means and then is discharged to the outside. Consequently, the hydrophilic polymer that remains in the hollow fiber membrane 10 is removed from the connection port 11a together with the washing liquid.

According to the method of causing the washing liquid to flow from the hollow portion of the hollow fiber membrane 10 to the outside using such a decompression method, the hydrophilic polymer that is separated from the hollow fiber membrane 10 is dispersed or dissolved in the washing liquid, and is adsorbed and removed together with the washing liquid, and thus, it is possible to reduce the possibility of re-attachment to the hollow fiber membrane 10 and to achieve a high removal effect.

As for the washing liquid, the example shown in (i) the washing process of the hollow fiber membrane may be used.

The temperature of the washing liquid is not particularly limited, but is preferably 30 to 80° C. If the temperature is high, the hydrophilic polymer is easily dispersed and dissolved in the washing liquid, but the saturated vapor pressure of the washing liquid is increased, which causes a problem that a high degree of decompression may not be secured. Contrarily, if the temperature is low, a high degree of decompression may be secured and moisture is easily extracted, but there is a problem that the dispersion and solubility of the hydrophilic polymer in the washing liquid is reduced.

Further, in order to enhance the effect of removing the hydrophilic polymer, by combining the washing liquid supply process of forcibly supplying the washing liquid to the hollow portion of the hollow fiber membrane 10 from the outside thereof with a rear stage of such a decompression process, it may enhance the removal effect of the hydrophilic polymer.

Specifically, two tubular members 11 as described above are prepared, these tubular members 11 are arranged in series in the washing tank 12 at an interval, the decompression means is connected to the connection port 11a of the tubular member 11 at the front stage, and supply means such as a pressure supply pump for supplying the washing liquid is connected to the connection port 11a of the tubular member 11 at the rear stage.

Further, the hollow fiber membrane 10 is sequentially introduced into the two tubular members 11 from the front stage, and the decompression means and the supply means are operated. Then, in the tubular member 11 at the rear stage, the washing liquid may be supplied from the outside of the hollow fiber membrane 10 to the hollow portion (washing liquid supply process), and the washing liquid may flow to the outside of the hollow fiber membrane 10 from the hollow portion in the tubular member 11 at the front stage (decompression process).

If the washing liquid supply process is provided at the rear stage of the decompression process in this way, the amount of the washing liquid that flows from the hollow portion of the hollow fiber membrane 10 to the outside thereof in the decompression process is increased. Consequently, the removal effect of the hydrophilic polymer is enhanced.

It is necessary to set conditions of the decompression process and the washing liquid supply process as conditions that the hollow fiber membrane 10 is hardly vibrated in the decompression process and the washing liquid supply process, in consideration of the type of the hollow fiber membrane 10 (material and membrane structure), the concentration of the hydrophilic polymer that remains in the hollow fiber membrane 10, the equipment cost for pressure resistance of each tubular member 11, the pressure resistance of the hollow fiber membrane 10 and the like. From this viewpoint, the pressure in the decompression process is preferably −0.05 to −0.1 MPa as a gauge pressure of the decompression means, and more preferably −0.08 to −0.1 MPa. The supply pressure in the washing liquid supply process is preferably higher than 0 and 0.4 MPa or lower as the gauge pressure of the supply means, and more preferably higher than 0 and 0.3 MPa or lower. Further, in this range, as the pressure difference of the gauge pressures in the decompression process and the washing liquid supply process is large, there is a tendency that a higher hydrophilic polymer removal effect is achieved.

If each staying time (staying time in each tubular member) of the hollow fiber membrane 10 in the decompression process and the washing liquid supply process is 2 to 10 seconds, it is possible to efficiently achieve a sufficient hydrophilic polymer removal effect.

[Drying Process]

Then, the hollow fiber membrane 10, for which the hydrophilic polymer removal process is performed, is dried (drying process).

In the drying process, a drying gas injection process in which part of the drying gas is transmissively introduced into the hollow portion of the hollow fiber membrane 10 from the outside is at least performed.

Figure 3:
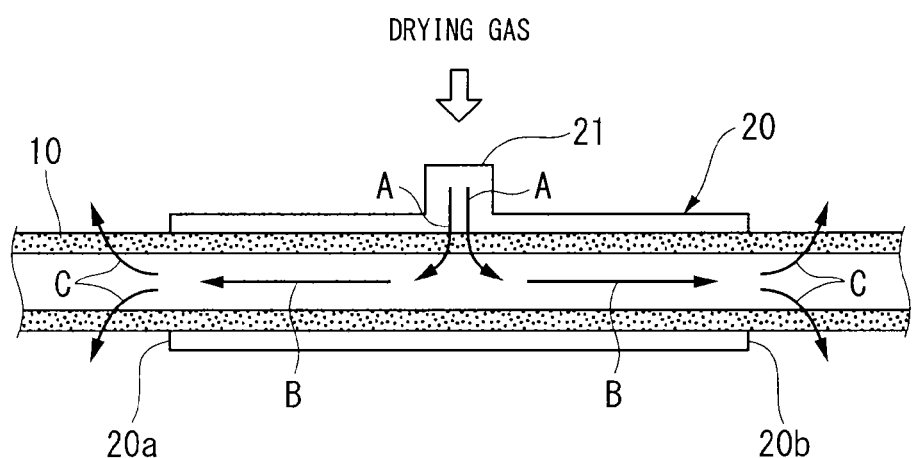
FIG. 3 is a configuration diagram schematically illustrating a drying gas injection process using a drying device that is an example of the present invention.

A drying device for a hollow fiber membrane that includes a pressure-resistant tubular drying member 20 and a gas supply unit 21 installed in the tubular drying member 20 as shown in FIG. 3, for example, is used in the drying gas injection process, and a high temperature gas such as hot air (high temperature air) or a high temperature inert gas is used as the drying gas.

The tubular drying member 20 of this example has a circular cross section in the radial direction (hereinafter, referred to as a transverse section), and is formed with such an inner diameter that the hollow fiber membrane 10 is capable of passing through the inside of the tubular drying member 20 along the length direction thereof while forming a gap between the inner circumferential surface of the tubular drying member 20 and the hollow fiber membrane 10. For example, the gas supply unit 21 for supplying the drying gas into the tubular drying member 20 is formed on a side surface (circumferential surface) of a central portion of the tubular drying member 20 in the length direction. Further, opposite ends 20a and 20b of the tubular drying member 20 are opened to form opening portions through which the hollow fiber membrane 10 is input and output. In this example, the opening portion of one end 20a is an inlet of the hollow fiber membrane 10, and the opening portion of the other end 20b is an outlet thereof.

In the tubular drying member 20, the hollow fiber membrane is continuously introduced from the opening portion of one end 20a to pass through the tubular drying member 20, the drying gas supply means (not shown) is connected to the gas supply unit 21 to be operated, and the drying gas is supplied into the tubular drying member 20. Then, the pressure of the outside of the hollow fiber membrane 10 in the tubular drying member 20 enters a high state compared with the hollow portion, due to the supply of the drying gas. Due to such a pressure difference, part of the drying gas passes through the membrane of the hollow fiber membrane 10, as indicated by arrow A in the figure, and is injected into the hollow portion of the hollow fiber membrane 10 from the outside thereof.

As described above, the drying gas introduced to the hollow portion of the hollow fiber membrane 10 flows in the hollow portion of the hollow fiber membrane 10 that passes through the tubular drying member 20, as indicated by arrow B in the figure, and reaches the positions of the opposite ends 20a and 20b of the tubular drying member 20. Then, since the pressure of the outside of the hollow fiber membrane 10 is lower than that of the hollow portion outside the tubular drying member 20, the drying gas passes through the membrane of the hollow fiber membrane 10 due to the pressure difference, as indicated by arrow C in the figure, and is discharged from the hollow portion of the hollow fiber membrane 10 to the outside thereof.

Further, moisture included in the hollow fiber membrane 10 follows the drying gas to be discharged from the hollow portion of the hollow fiber membrane 10 to the outside thereof. That is, the moisture is discharged from the outer surface of the hollow fiber membrane 10 to the outside thereof. At this time, under the condition that a large amount of moisture included in the hollow fiber membrane 10 is present, the drying gas may not be discharged to the outside as indicated by arrow C in the figure, but instead, part of the moisture in the membrane may be extruded and discharged by the pressure of the drying gas in the hollow portion.

In this way, the drying gas passes through and is introduced to the hollow portion from the outside of the hollow fiber membrane 10, and then, the drying gas passes through the hollow portion of the hollow fiber membrane 10. According to the drying gas injection process of discharging the gas from the hollow portion to the outside, for example, in the hot air circulation drying device, compared with a method of causing the hollow fiber membrane 10 to reciprocally run and supplying the hot air to the outer circumferential side of the hollow fiber membrane 10 to dry the hollow fiber membrane 10 in the related art, it is possible to efficiently dry the hollow fiber membrane 10 with a very small amount of hot air in a short time, to thereby achieve a very low cost. Further, the drying gas injection process may be conveniently performed by the drying device provided with the small tubular drying member 20 through which the hollow fiber membrane 10 passes, and large equipment is not necessary, which is also preferable in view of an installation space.

The conditions of the drying gas injection process may be appropriately set according to the type of the hollow fiber membrane 10 (material and membrane structure), the amount of moisture that remains in the hollow fiber membrane 10 or the like, but the temperature of the drying gas is preferably 90 to 110° C., and more preferably 95 to 105° C. With such a temperature, although subjected by the material of the hollow fiber membrane 10, it is possible to effectively perform drying without experiencing negative influence due to heat to the hollow fiber membrane 10. Further, it is possible to appropriately suppress the energy cost for heating the drying gas. Here, the temperature of the drying gas is measured in the gas supply unit 21 of the tubular drying member 20.

As for the supply pressure of the drying gas, a range of 0.1 to 0.3 MPa is preferable as a gage pressure of the drying gas in the gas supply unit 21 of the tubular drying member 20, and a range of 0.1 to 0.2 MPa is more preferable. If the supply pressure is in this range, it is possible to efficiently dry the hollow fiber membrane 10, and to appropriately suppress the device cost for enhancing pressure resistance of the tubular drying member 20. Thus, a problem that the hollow fiber membrane 10 is vibrated hardly occurs. Further, with such a range, the supply pressure of the drying gas does not exceed the pressure resistance of the hollow fiber membrane 10.

In order to set the supply pressure in such a range, it is necessary to appropriately determine the inner diameter and the length of the tubular drying member 20 according to the outer diameter of the hollow fiber membrane 10.

That is, if the inner diameter of the tubular drying member 20 is excessively large, it is not possible to sufficiently secure the pressure difference between the outside of the hollow fiber membrane 10 and the hollow portion thereof in the tubular drying member 20, and consequently, there is a tendency that it is difficult to obtain the supply pressure. On the other hand, if the inner diameter of the tubular drying member 20 is excessively small, the hollow fiber membrane 10 and the inner circumferential surface of the tubular drying member 20 in the drying gas injection process may be in contact with each other, and thus, there is a possibility that the hollow fiber membrane 10 is damaged. Further, as the length of the tubular drying member 20 is increased, there is a tendency that it is easy to obtain the sufficient supply pressure, but if the length is excessively long, problems such as increase in the size of the device and reduction in working performance may occur.

From this viewpoint, the clearance between the hollow fiber membrane 10 and the tubular drying member 20 is preferably 0.4 mm to 1.6 mm, and more preferably 0.6 mm to 1.2 mm. Here, the clearance refers to the difference between ½ of the inner diameter of the tubular drying member 20 and ½ of the outer diameter of the hollow fiber membrane 10. Further, at this time, the ratio between the length of the tubular drying member 20 and the clearance is preferably 2000:1 to 1000:1, and more preferably 1800:1 to 1200:1.

The outer diameter of the hollow fiber membrane 10 is a value measured by an outer diameter detector (LS-3030, made by KEYECE Corporation).

Further, in the case of the supply pressure, if the staying time (in the drying gas injection process, the time when the drying gas stays in the tubular drying member 20) of the hollow fiber membrane 10 in the drying gas injection process is 20 to 40 seconds, it is possible to efficiently and sufficiently perform drying.

The running speed of the hollow fiber membrane 10 in the tubular drying member 20 may be determined so that the staying time is in the above-described range, but normally, the running speed has the same speed as the spinning speed, which becomes 8 to 15 m/min. Further, it is preferable that the length of the tubular drying member 20 be determined in consideration of the staying time, in addition to the clearance between the hollow fiber membrane 10 and the tubular drying member 20.

Figure 4:
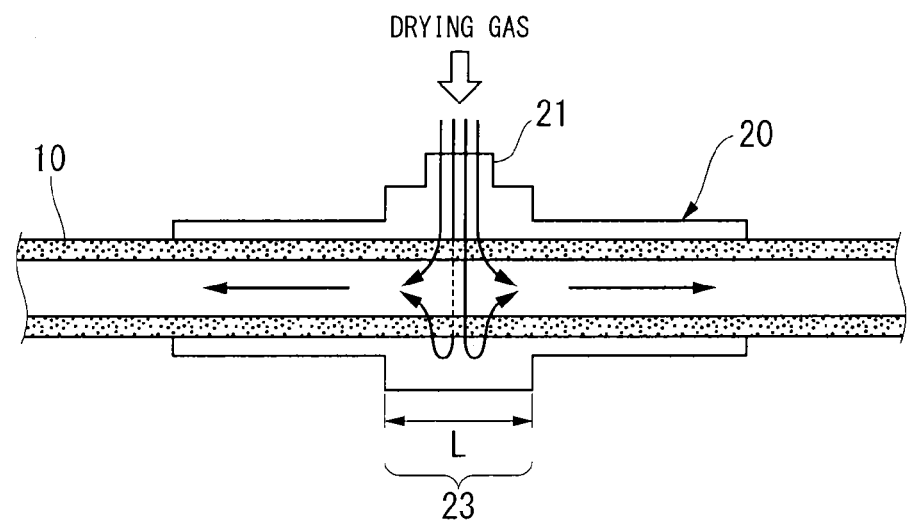
FIG. 4 is a configuration diagram schematically illustrating a drying gas injection process using a drying device that is another example of the present invention.

In such a drying device, in a case where the drying gas is supplied from the gas supply unit 21 to the tubular drying member 20, the drying gas is in contact with the hollow fiber membrane 10 that passes through the tubular drying member 20 in one direction, and consequently, the vibration of the hollow fiber membrane 10 may occur. In order to suppress the vibration, as shown in FIG. 4, in the tubular drying member 20, it is preferable to expand the diameter of a portion where the gas supply unit 21 is formed, as a diameter expansion portion 23, with respect to a different portion of the tubular drying member 20, and to form the cross-sectional area in the diameter direction thereof to be large. By providing the diameter expansion portion 23, the drying gas from the gas supply unit 21 turns the hollow fiber membrane 10 around in the circumferential direction in the diameter expansion portion 23, and is in contact with the hollow fiber membrane 10 while being dispersed, not in one direction. As a result, it is possible to suppress the vibration of the hollow fiber membrane 10.

The length L of the diameter expansion portion 23 is determined according to the supply pressure of the drying gas or the like so as to include at least the portion to which the gas supply unit 21 is connected.

Figure 5A:
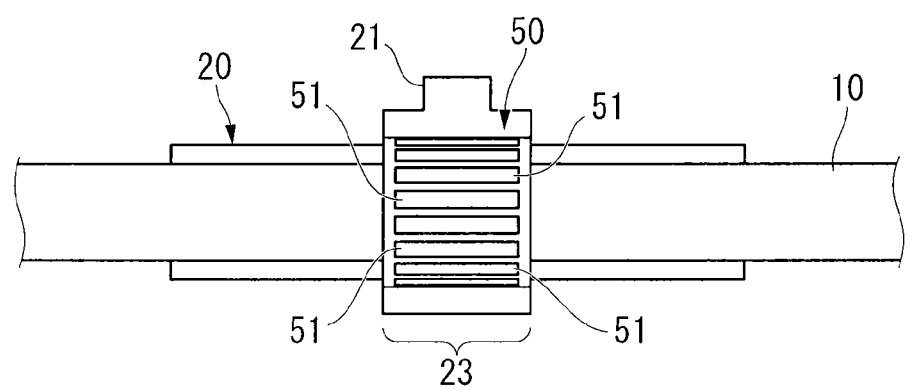
FIG. 5A is a configuration diagram schematically illustrating a drying gas injection process using a drying device that is still another example of the present invention.
Figure 5B:
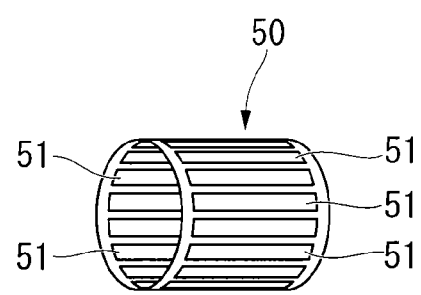
FIG. 5B is a perspective view illustrating a gas dispersing element provided in FIG. 5A.

Further, as shown in FIGS. 5A and 5B, if a gas dispersing element 50 that disperses the drying gas from the gas supply unit 21 is arranged inside the diameter expansion portion 23, it is possible to enhance dispersibility of the drying gas and to effectively suppress the vibration.

Figure 6:
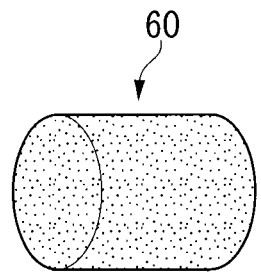
FIG. 6 is a perspective view illustrating another example of a gas dispersing element.

The gas dispersing element 50 in this example has a bottomless cylindrical shape (cylindrical body) and has a plurality of slits 51 on an entire circumferential wall in the length direction thereof, and is arranged in a direction where its axial line coincides with an axis line of the tubular drying member 20. If the gas dispersing element 50 is arranged inside the diameter expansion portion 23 and the hollow fiber membrane 10 passes through the inside thereof, the drying gas from the gas supply unit 21 is dispersed by the plurality of slits 51 and is in contact with the hollow fiber membrane 10, and thus, it is possible to suppress the vibration. Further, as shown in FIG. 6, it is possible to appropriately use a gas dispersing element 60 of a porous structure in which a plurality of through holes is formed on its circumferential wall.

The gas dispersing element 50 or 60 may be disposed in the tubular drying member in which the diameter expansion portion is not provided. In this case, in the tubular drying element, the gas dispersing element 50 or 60 may be arranged in the portion where the gas supply unit is formed.

Figure 7:
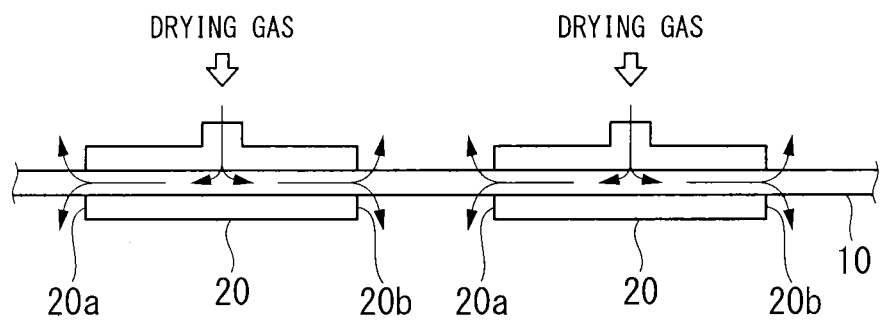
FIG. 7 is a configuration diagram schematically illustrating a drying gas injection process using a drying device that is still another example of the present invention.

In order to enhance the drying effect, as shown in FIG. 7, the drying gas injection process may be performed using a method of installing a plurality of (two in FIG. 7) tubular drying members 20 in series at an interval, introducing the drying gas into the respective tubular drying members 20 and sequentially passing the hollow fiber membrane 10 through the tubular drying members 20. For example, when comparing a case where two tubular drying members 20 having a length a are arranged in series at an interval and the drying gas injection process is performed with a case where the drying gas injection process is performed using one tubular drying member 20 having the length 2a, in a case where the two tubular drying members 20 are installed in series, the introduction and discharge of the drying gas into and from the hollow portion of the hollow fiber membrane 10 is performed twice, and in a case where the one tubular drying member 20 is used, the introduction and discharge of the drying gas is performed once. It is considered that the drying effect is affected by the number of times of introduction and discharge of the drying gas in this way. Further, in the hollow portion of the hollow fiber membrane 10 between the tubular drying members 20 that are installed in series as shown in FIG. 7, the drying gases that are respectively introduced through the adjacent tubular drying members 20 collide with each other, and thus, the drying gases are more effectively discharged to the outside. Thus, by installing the plurality of tubular drying members 20 in series at intervals, it is possible to expect a high drying effect.

Figure 8:
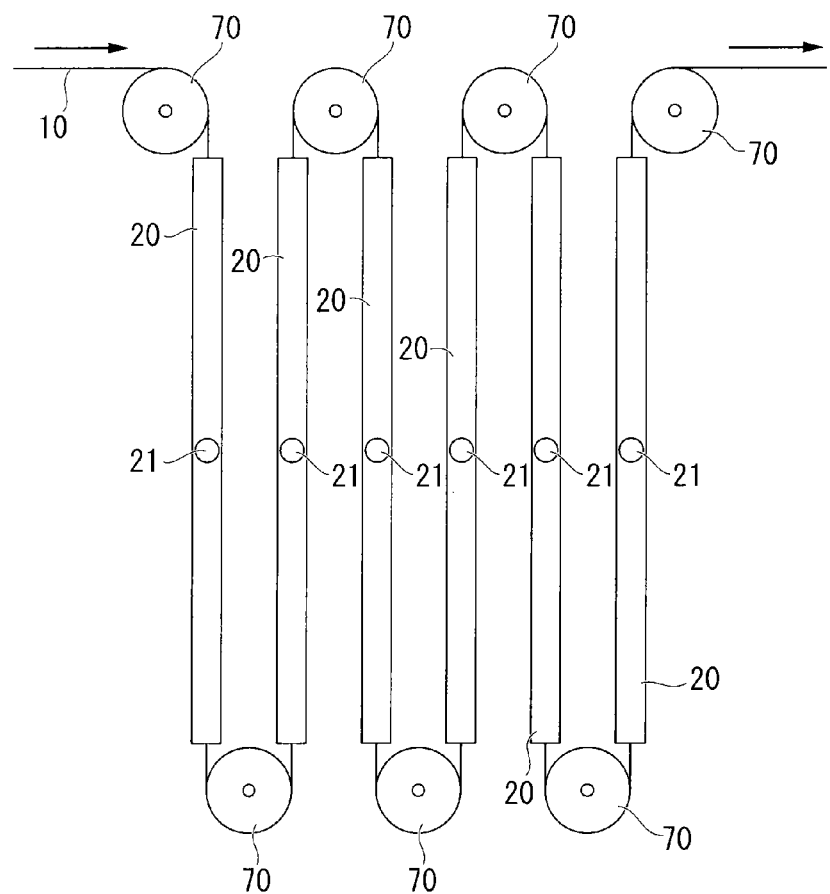
FIG. 8 is a configuration diagram schematically illustrating a drying gas injection process using a drying device that is still another example of the present invention.

Further, for example, in a case where the plurality of tubular drying members 20 are used and are arranged in series as described above, as shown in FIG. 8, it is preferable to arrange the respective tubular drying members 20 in parallel so that the length direction of each tubular drying member 20 is vertical and to cause the hollow fiber membrane 10 to sequentially pass through the tubular drying members 20 while changing the running direction of the hollow fiber membrane 10 by a guide roller 70 arranged between the tubular drying members 20. If the length direction of the tubular drying member 20 is arranged to be horizontal, in a case where the length of the tubular drying member 20 is long, since an interval between support points positioned between the tubular drying members 20 is also increased, the hollow fiber membrane 10 is bent in the tubular drying member 20 due to its weight, and enters a state of sliding on the inner circumferential surface of the tubular drying member 20. In order to prevent such a bending problem of the hollow fiber membrane 10, it is preferable to arrange the tubular drying members 20 so that the length direction of the tubular drying member 20 is vertical.

Figure 9:
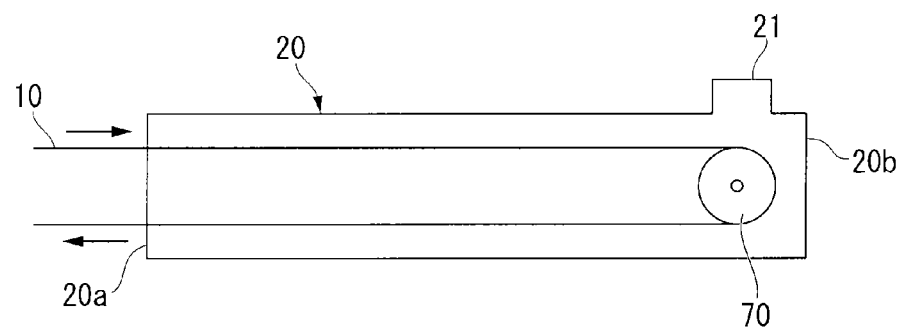
FIG. 9 is a configuration diagram schematically illustrating a drying gas injection process using a drying device that is still another example of the present invention.

Further, as shown in FIG. 9, as for the tubular drying member 20, a member that is opened only at one end 20*a* and is closed at the other end 20*b* may be used. In this case, the hollow fiber membrane 10 is introduced from the opening portion into the tubular drying member 20 and is turned by the guide roller 70 arranged on the side of the other end 20*b* in the tubular drying member 20, and then is delivered to the outside of the tubular drying member 20 through the opening portion. According to such a turning type, compared with a case where the hollow fiber membrane 10 is not turned, the drying efficiency per unit length of the tubular drying member 20 is superior.

Further, in the example shown in FIG. 3, as for the tubular drying member 20, the member having the circular transverse section is employed, but the shape of the transverse section is not particularly limited, and a polygonal shape such as a tetragonal shape including a square or rectangular shape or a hexagonal shape may be used. However, it is preferable to use a circular or square shape from the viewpoint that the flow of the drying gas hardly becomes a turbulent flow and the vibration of the hollow fiber membrane 10 is easily suppressed.

Figure 10A:
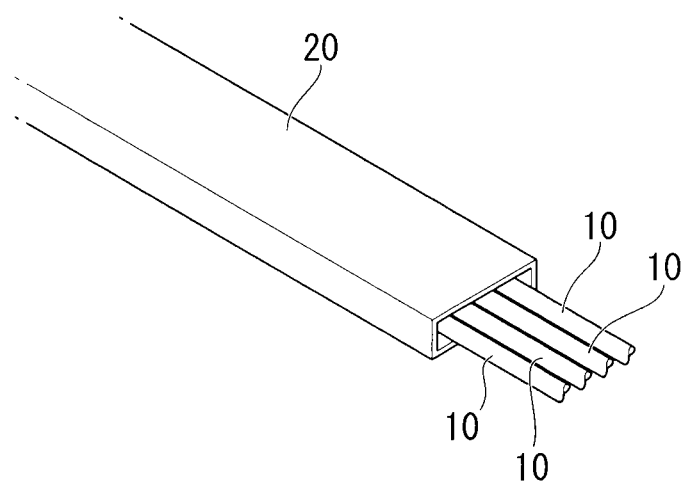
FIG. 10A is a perspective view schematically illustrating a tubular drying member provided in a drying device that is still another example of the present invention.
Figure 10B:
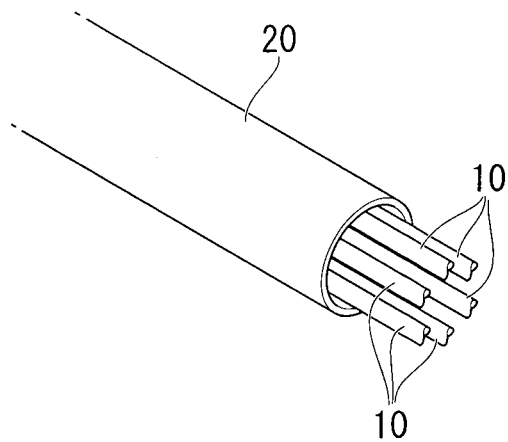
FIG. 10B is a perspective view schematically illustrating a tubular drying member provided in a drying device that is still another example of the present invention.

Further, the shape and size of the transverse section of the tubular drying member 20 may be appropriately determined according to the number of the hollow fiber membranes 10 passing through the inside of the tubular drying member 20. For example, in a case where one hollow fiber membrane 10 passes through the inside of one tubular drying member 20, the transverse section of the tubular drying member is preferably circular or square. On the other hand, for example, in a case where the plurality of hollow fiber membranes 10 pass through in parallel the inside of one tubular drying member, as shown in FIG. 10A, it is preferable that the transverse section of the tubular drying member 20 be rectangular and the hollow fiber membranes 10 be arranged in parallel in a line. Further, as shown in FIG. 10B, it is preferable to use a type in which the transverse section of the tubular drying member 20 is circular and the hollow fiber membranes 10 are arranged around the axis line of the tubular drying member 20, or an example in which the hollow fiber membranes 10 are arranged in a staggered manner, seen from the transverse section side of the tubular drying member 20.

The position where the gas supply unit 21 is formed may be a side surface (circumferential surface) of the center of the tubular drying member 20 in the length direction, as shown in FIG. 3, or may be a position deviated from the center as shown in FIG. 9. Further, in a case where the gas supply unit 21 is disposed at the position deviated from the center, the position of the gas supply unit 21 may be an upstream side of the running direction when the hollow fiber membrane 10 passes through, or may be a downstream side thereof.

In order to efficiently perform the drying gas injection process, in the drying process, it is preferable to provide the preliminary drying process before the drying gas injection process. By providing the preliminary drying process and removing the moisture from the hollow fiber membrane 10 to a certain degree in this way, it is possible to further enhance the drying effect in the drying gas injection process.

As a specific method, for example, a method of supplying a high-temperature drying gas to the outer circumferential side of the hollow fiber membrane 10 for drying (hot air drying process), a method of decompressing and drying the hollow fiber membrane 10 (decompression drying process), or the like may be used, and a combination of these methods may be used.

Figure 11:
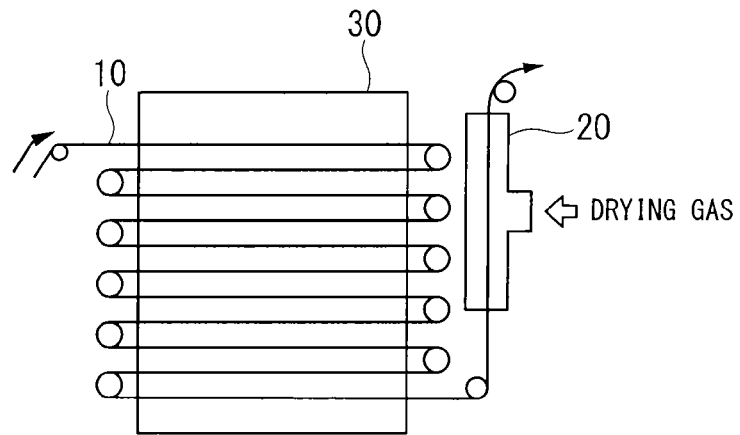
FIG. 11 is a configuration diagram schematically illustrating an example in which a drying gas injection process is performed after a preliminary drying process.

In a case where the hot air drying process is performed as the preliminary drying process, as a specific method, as shown in FIG. 11, for example, a method of causing the hollow fiber membrane 10 to continuously run in a circulating hot air dryer 30 that circulates hot air with a temperature of 95 to 115° C., for example, at a wind speed of about several meters per second, and drying the hollow fiber membrane 10 from the outer circumferential side thereof may be used. In this way, after the hollow fiber membrane 10 passes through the hot air dryer 30, the hollow fiber membrane 10 may pass through the tubular drying member 20 for the drying gas injection process, and then, the drying gas injection process may be performed. If the staying time (in the hot air drying process, the time when the hollow fiber membrane 10 stays in the hot air dryer 30) of the hollow fiber membrane 10 in the hot air drying process is in a range of 5 seconds to 90 seconds, it is possible to achieve a sufficient effect of the preliminary drying.

Figure 12:
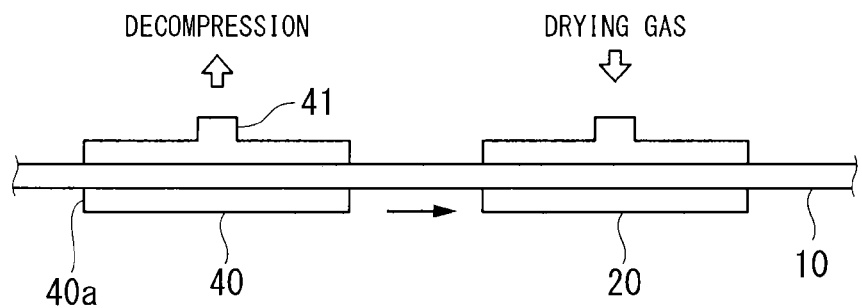
FIG. 12 is a configuration diagram schematically illustrating another example in which a drying gas injection process is performed after a preliminary drying process.

In a case where the decompression drying process is performed, as shown in FIG. 12, a pressure-resistant tubular drying member 40 similar to the member used in the drying gas injection process may be arranged at a stage before the drying gas injection process, and the decompression drying process may be performed using the tubular drying member 40, and then, the drying gas injection process may be performed. As for the tubular drying member 40 used in the decompression drying process, it is necessary to maintain the inside of the tubular drying member 40 in a decompressed state compared with the outside thereof. Thus, at opposite ends of the tubular drying member 40, it is preferable to install a seal mechanism (not shown) that includes a labyrinth seal or the like capable of maintaining the inside of the tubular drying member 40 in the decompressed state compared with the outside thereof, while maintaining the clearance through which the hollow fiber membrane 10 can pass.

Further, first, the hollow fiber membrane 10 is continuously introduced from one end 40*a* of the tubular drying member 40 for the decompression drying process, and decompression means such as a decompression pump (not shown) is connected to an opening 41 formed on the side surface of the tubular drying member 40 for operation, to decompress the inside of the tubular drying member 40. Thus, in the tubular drying member 40, the outside of the hollow fiber membrane 10 is decompressed, and thus, the moisture in the hollow fiber membrane 10 follows the gaseous phase to be adsorbed to the outside of the hollow fiber membrane 10 for removal. The pressure at this time is preferably −0.05 to −0.1 MPa as a gauge pressure of the decompression means, and more preferably −0.08 to −0.1 MPa. Further, if the staying time (in the decompression process, the time when the hollow fiber membrane 10 stays in the tubular drying member 40) of the hollow fiber membrane 10 in the decompression process is in a range of 5 seconds to 30 seconds, it is possible to achieve a sufficient effect of the preliminary drying.

Then, the hollow fiber membrane 10 may pass through the tubular drying member 20 for the drying gas injection process to perform the drying gas injection process.

Figure 13:
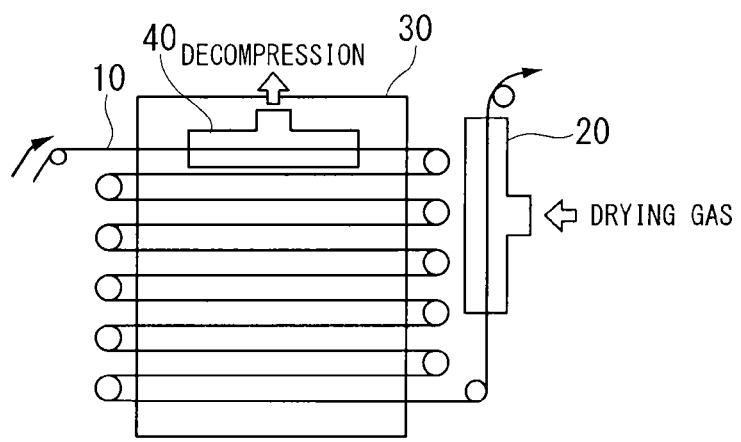
FIG. 13 is a configuration diagram schematically illustrating still another example in which a drying gas injection process is performed after a preliminary drying process.

In a case where the preliminary drying process is performed with the combination of the hot air drying process and the decompression drying process, a method of sequentially performing these processes may be used, but for example, as shown in FIG. 13, by installing the tubular drying member 40 for the decompression drying process in the hot air dryer 30, it is possible to synergistically achieve the drying effect due to the hot air and the drying effect due to the decompression drying.

As described above, by drying the hollow fiber membrane 10 using the drying device that includes the tubular drying member 20 in which the opening through which the hollow fiber membrane 10 is input and output is formed on at least one of one end 20a and the other end 20b in the length direction and the hollow fiber membrane 10 passes through the inside of the tubular drying member 20 while forming the gap between the hollow fiber membrane 10 and the inner circumferential surface of the tubular drying member 20, and the gas supply unit 21 that is formed on the side surface of the tubular drying member 20 and supplies the drying gas into the tubular drying member, it is possible to dry the hollow fiber membrane 10 with an extremely small amount of hot air in a short time at a low cost. Further, according to this drying device, large equipment is not necessary, which is preferable in view of the installation space.

EXAMPLES

Hereinafter, the invention will be specifically described referring to examples.

Example 1

Polyvinylidene fluoride A (product name, Kynar 301F, made by ATOPINA Japan K.K.), Polyvinylidene fluoride B (product name, Kynar 9000LD, made by ATOPINA Japan K.K.), polyvinylpyrrolidone (product name, K-90, made by ISP Corp.) and N, N-dimethylacetamide were respectively mixed with each other so as to achieve the mass ratios shown in Table 1, to prepare a membrane forming dope (1) and a membrane forming dope (2).

Then, a nozzle in which a hollow portion is formed at the center thereof and double annular discharge ports are sequentially formed outside the center so as to sequentially coat two kinds of liquids (refer to FIG. 1 in Japanese Unexamined Patent Application, First Publication No. 2005-42074) which was prepared, and in a state where the nozzle was kept warm at 30° C., polyester multi-filament singly-knitted braids (multi-filaments; 830/96F, 16 strokes) were introduced in the hollow portion as a porous material. Then, the membrane forming dope (2) and the membrane forming dope (1) were sequentially coated on the outer circumference from the inside, and the result was coagulated in a coagulating liquid (a mixture of 5 parts by mass of N, N-dimethylacetamide and 95 parts by mass of water) that was kept at 80° C. Thus, a hollow fiber membrane was obtained in which a porous layer that has a single fraction layer in the vicinity of the outer surface and has an inclined structure in which the pore diameter increases toward the inside is coated on the braids. Among the coated membrane forming dopes (1) and (2), a main dope that forms the membrane structure of the hollow fiber membrane is the membrane forming dope (1) that is coated on the outside.

Further, a nozzle in which a hollow portion having an inner diameter larger than the outer diameter of the hollow fiber membrane is formed at the center and double annular discharge ports are sequentially formed outside the center so as to sequentially coat two kinds of liquids (refer to FIG. 1 in Japanese Unexamined Patent Application, First Publication No. 2005-42074) which was prepared, and in a state where the nozzle was kept warm at 30° C., the hollow fiber membrane obtained as described above was introduced into the hollow portion. Then, glycerin (First class, made by Wako Pure Chemical Industries Ltd.) and the membrane forming dope (1) were sequentially coated on the outer circumference from the inside, and the result was coagulated in the coagulating liquid kept at 80° C. that is the same as the previously used temperature.

The spinning speed at this time (running speed of the hollow fiber membrane) was 8.8 m/min.

TABLE 1

| composition | Membrane forming dope (1) | Membrane forming dope (2) |
|---|---|---|
| Polyvinylidene fluoride A | 12 | 3 |
| Polyvinylidene fluoride B | 8 | 2 |
| polyvinyl-pyrrolidone | 10 | 2 |
| N,N-dimethylacetamide | 70 | 93 |
| Dope temperature | 60° C. | 50° C. |
| Concentration of polyvinylidene fluoride in dope | 20% | 5% |

(Hydrophilic Polymer Removal Process)

With respect to the obtained hollow fiber membrane, the hydrophilic polymer removal process was performed as follows:

(1) Preliminary Process

As for the preliminary process, the following (i) to (iii) processes were repeated twice:

(i) Washing Process of Hollow Fiber Membrane

The hollow fiber membrane was immersed in a washing tank in which boiling water of 100° C. was contained under the condition of a staying time of 5 minutes, to perform washing.

(ii) Process of Reducing Molecular Weight of Hydrophilic Polymer Using Oxidizing Agent Next, the hollow fiber membrane was immersed in a water tank in which a water solution of hypochlorite having a temperature of 30° C. and a concentration of 60000 mg/L was contained under the condition of a staying time of 1 minute. Then, the hydrophilic polymer was heated under the conditions of a temperature of 85° C., wet heating of a relative humidity of 100% and a staying time of 3 minutes, to reduce the molecular weight of the hydrophilic polymer.

(iii) Washing Process of Hydrophilic Polymer Having Reduced Molecular Weight

Then, the hollow fiber membrane was washed again under the same condition as in (i).

(2) Decompression Process, Washing Liquid Supply Process and Decomposition Process A washing tank in which water of 74° C. is contained as a washing liquid was prepared, and three tubular members 11 shown in FIG. 1 were arranged in series at intervals. Then, the hollow fiber membrane 10 was sequentially introduced to these tubular members 11 from the previous stage. Here, decompression means was connected to the connection port 11a of the tubular member 11 that is disposed at the first stage among the three tubular members and the connection port 11a of the tubular member 11 that is disposed at the last stage among the three tubular members, and the gauge pressure of the decompression means was decompressed to be −0.06 MPa in the front-stage decompression process and to be −0.05 MPa in the last-stage decompression process. From the supply means connected to the connection port 11a of the central tubular member 11 among the three tubular members, water of 74° C. was supplied as the washing liquid so that the gauge pressure is 0.1 MPa.

Further, the time (staying time) when the hollow fiber membrane 10 stays in each of three tubular members 11 was about 3 seconds.

(Drying Process)

Next, the drying process was performed for the hollow fiber membrane 10 after the hydrophilic polymer removal process. Specifically, six tubular drying members (made of stainless steel and having an inner diameter of 4 mm and a length of about 780 mm) 20 shown in FIG. 3 were prepared and were arranged in series at intervals. Then, the drying gas injection process was performed.

The drying gas supply means was connected to the gas supply unit 21 in each of six tubular drying gas members 20 used in the drying gas injection process, and hot air with a temperature of 95° C. was introduced as a drying gas. At this time, the supply pressure of the drying gas (gauge pressure of the drying gas in the gas supply unit 21) was set to 0.2 MPa. Here, a specific supply amount of the hot air was 1140 L/min (190 L/min per tubular drying member). The running speed of the hollow fiber membrane 10 in the tubular drying member 20 was 8.8 m/min that is the same as the spinning speed. Further, the staying time of the hollow fiber membrane 10 in the tubular drying member 20 (total time when the hollow fiber membrane 10 stays in the six tubular drying members 20 in the drying gas injection process) was 30 seconds.

The degree of moisture was measured with respect to the hollow fiber membrane 10 after such a drying process, and the result was 0.8%.

The degree of moisture refers to the degree of moisture from the result of the drying indicating the ratio of the remaining moisture mass to the dry mass of the hollow fiber membrane 10. Further, an infrared moisture meter made by Kett Electric Laboratory was used for measurement of the degree of moisture.

The hollow fiber membrane 10 having a braid support of a dual structure, finally obtained in this way had an outer diameter of 2.8 mm and an inner diameter of 1.0 mm.

Further, from the outer diameter of the hollow fiber membrane 10 and the inner diameter of the tubular drying member 20, the clearance between the hollow fiber membrane 10 and the tubular drying member 20 is 0.6 mm, and the ratio of the length of the tubular drying member 20 and the clearance is 780:0.6=1300:1.

The outer diameter of the hollow fiber membrane 10 was measured using an outer diameter detector (model LS-3030, made by KEYECE Corporation). Specifically, two outer diameter detectors were prepared, the detectors were respectively installed so that the measured diameters are shifted from each other by 90° centering around the axis line of the hollow fiber membrane 10, the diameters were measured in two directions. The measurement results were 2.8 mm in both cases.

Example 2

After the hydrophilic polymer removal process was performed in a similar way to Example 1, the drying process was performed. The drying process was performed under the same conditions as those of Example 1 except that the hot air temperature introduced as the drying gas was 90° C., the supply pressure of the drying gas was 0.3 MPa, and the supply amount of the hot air was 1350 L/min (225 L/min per tubular drying member).

As a result, it was possible to obtain the hollow fiber membrane 10 having the same degree of moisture as that of Example 1.

Example 3

After the hydrophilic polymer removal process was performed in a similar way to Example 1, the drying process was performed. The drying process was performed under the same conditions as those of Example 1 except that the hot air temperature introduced as the drying gas was 110° C., the supply pressure of the drying gas was 0.15 MPa, and the supply amount of the hot air was 1050 L/min (175 L/min per tubular drying member).

As a result, it was possible to obtain the hollow fiber membrane 10 having the same degree of moisture as that of Example 1.

Comparative Example

The hollow fiber membrane 10 was dried using a hot air circulation dryer until the amount of moisture of the hollow fiber membrane 10 after the drying process became the same degree as that of Example 1. The hot air temperature was 115° C.

As a result, the drying time, that is, the staying time of the hollow fiber membrane 10 in the hot air circulation dryer was 200 seconds, which was a relatively long time.

Industrial Applicability

According to the present invention, it is possible to provide a hollow fiber membrane drying device capable of drying a hollow fiber membrane in a short time at a low cost, without the necessity of large equipment, and to provide a drying method using the drying device.

Reference Signs List

10 HOLLOW FIBER MEMBRANE
20 TUBULAR DRYING MEMBER
21 GAS SUPPLY UNIT

The invention claimed is:

1. A drying method comprising:
   supplying a drying gas from a gas supply unit into a tubular drying member, wherein the gas supply unit is disposed on a side surface of the tubular drying member, and the tubular drying member comprises an opening portion through which a hollow fiber membrane is input and output at at least one end thereof in a length direction, the hollow fiber membrane passing inside the tubular drying member while forming a gap between the hollow fiber membrane and an inner circumferential surface of the tubular drying member;
   injecting part of the drying gas into a hollow portion of the hollow fiber membrane from an outside of the hollow fiber membrane; and
   discharging moisture present in the hollow fiber membrane from an outer surface of the hollow fiber membrane by a pressure difference, between the outside of the hollow fiber membrane and the hollow portion thereof, that occurs outside the tubular drying member.

2. The method of claim 1,
   wherein a portion of the tubular drying member where the gas supply unit is disposed is a diameter expansion portion that is expanded in diameter with respect to a different portion thereof.

3. The method of claim 2,
   wherein a gas dispersing element that disperses the drying gas from the gas supply unit is disposed in the diameter expansion portion.

4. The method of claim 1,
   wherein the tubular drying member is capable of passing a plurality of hollow fiber membranes therethrough.

5. The method of claim 1,
   wherein the tubular drying member is vertically disposed.

6. The method of claim 1, wherein the drying gas is air.

7. The method of claim 1, wherein the drying gas is an inert gas.

8. The method of claim 1, wherein a temperature of the drying gas is 90 to 110° C.

9. The method of claim 1, wherein a temperature of the drying gas is 95 to 105° C.

10. The method of claim 1, wherein a gauge pressure of the drying gas is 0.1 to 0.3 MPa.

11. The method of claim 1, wherein a gauge pressure of the drying gas is 0.1 to 0.2 MPa.

12. The method of claim 1, wherein the gap is 0.4 to 1.6 mm.

13. The method of claim 1, wherein the gap is 0.6 to 1.2 mm.

14. The method of claim 1, wherein a ratio of a length of the tubular drying member and the gap is in a range of 2000:1 to 1000:1.

15. The method of claim 1, wherein a ratio of a length of the tubular drying member and the gap is in a range of 1800:1 to 1200:1.

16. The method of claim 1, wherein the drying gas has a residence time of 20 to 40 seconds.

17. A drying method comprising:
supplying a drying gas from a gas supply unit into a tubular drying member, wherein the gas supply unit is disposed on a side surface of the tubular drying member, and the tubular drying member comprises an opening portion through which a hollow fiber membrane is input and output at at least one end thereof in a length direction, the hollow fiber membrane passing inside the tubular drying member while forming a gap between the hollow fiber membrane and an inner circumferential surface of the tubular drying member;
injecting part of the drying gas into a hollow portion of the hollow fiber membrane from an outside of the hollow fiber membrane; and
discharging the drying gas injected in the hollow portion to the outside of the hollow fiber membrane from the hollow portion thereof by a pressure difference, between the outside of the hollow fiber membrane and the hollow portion thereof, that occurs outside the tubular drying member.

18. The method of claim 17,
wherein a portion of the tubular drying member where the gas supply unit is disposed is a diameter expansion portion that is expanded in diameter with respect to a different portion thereof.

19. The method of claim 18,
wherein a gas dispersing element that disperses the drying gas from the gas supply unit is disposed in the diameter expansion portion.

20. The method of claim 17,
wherein the tubular drying member is capable of passing a plurality of hollow fiber membranes therethrough.

21. The method of claim 17,
wherein the tubular drying member is vertically disposed.

22. The method of claim 17, wherein the drying gas is air.

23. The method of claim 17, wherein the drying gas is an inert gas.

24. The method of claim 17, wherein a temperature of the drying gas is 90 to 110° C.

25. The method of claim 17, wherein a temperature of the drying gas is 95 to 105° C.

26. The method of claim 17, wherein a gauge pressure of the drying gas is 0.1 to 0.3 MPa.

27. The method of claim 17, wherein a gauge pressure of the drying gas is 0.1 to 0.2 MPa.

28. The method of claim 17, wherein the gap is 0.4 to 1.6 mm.

29. The method of claim 17, wherein the gap is 0.6 to 1.2 mm.

30. The method of claim 17, wherein a ratio of a length of the tubular drying member and the gap is in a range of 2000:1 to 1000:1.

31. The method of claim 17, wherein a ratio of a length of the tubular drying member and the gap is in a range of 1800:1 to 1200:1.

32. The method of claim 17, wherein the drying gas has a residence time of 20 to 40 seconds.

* * * * *